July 20, 1926.
R. V. L. HARTLEY
MEANS FOR MODULATING HIGH FREQUENCY OSCILLATIONS
Filed May 28, 1918
1,592,934
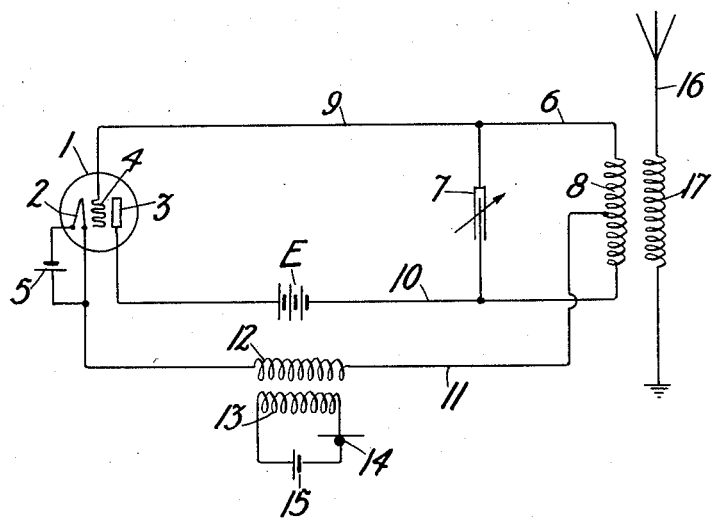
Inventor:
Ralph V. L. Hartley
by  J. E. Roberts  Att'y.

Patented July 20, 1926.

1,592,934

UNITED STATES PATENT OFFICE.

RALPH V. L. HARTLEY, OF EAST ORANGE, NEW JERSEY, ASSIGNOR TO WESTERN ELECTRIC COMPANY, INCORPORATED, OF NEW YORK, N. Y., A CORPORATION OF NEW YORK.

MEANS FOR MODULATING HIGH-FREQUENCY OSCILLATIONS.

Application filed May 28, 1918. Serial No. 237,033.

This invention relates to a means and method of modulating high frequency oscillations for signaling or other purposes, which means includes a vacuum tube discharge device of the audion type, or its equivalent.

It has already been proposed to control the input or filament-grid circuit of a vacuum tube of the audion type upon which a high frequency alternating electromotive force is impressed for the purpose of modulating high frequency oscillations in accordance with a signal or current variations of relatively low frequency.

The present invention has two principal objects, the first of which is to modulate oscillations by a variable impedance device or means which controls the output circuit of a generating or amplifying or modulating system having an input and an output circuit and which preferably has a feedback connection from the latter to the former. The variable impedance device or means may assume a great variety of forms which may be associated with the output circuit in many different ways.

A second object of the invention is to so associate the variable impedance device or means with the input circuit of the generating or amplifying or modulating device as well as with the output circuit, that the control of the two circuits is simultaneous and the effects produced cumulative.

As applicable to an oscillation generator of the audion type, the invention may be looked upon as a means for producing modulated oscillations by applying a variable potential to the plate circuit of the oscillator, and, more specifically, as a means for controlling both the output and the input circuit of an audion oscillator by means of a microphone.

The objects of this invention may be accomplished by many different arrangements and combinations of devices. For the purpose of illustration, a single modification only is described herein and illustrated in the accompanying drawing, to which reference is made in the following description, it being understood that the scope of the invention is limited only by the prior art or as specifically set forth in the appended claims.

A vacuum tube 1 of the audion type contains a filamentary cathode 2, an anode 3 consisting of a plate, and impedance-varying element or grid 4. The cathode is heated by battery 5. An oscillation circuit 6 includes a variable capacity 7 and an inductance 8, the values of which primarily determine the frequency of the oscillations generated. Leads 9, 10 and 11 connect the oscillation circuit to the various electrodes of the tube 1, as shown. Lead 10 contains battery E which supplies space current to the tube 1. The parts so far described constitute an oscillation generator which operates in a manner well understood by those skilled in the art. Lead 11 contains coil 12 to which is coupled the coil 13 serially located in circuit with microphone 14 and source of potential 15.

Variations of current in the microphone circuit will cause corresponding changes of difference of potential between the anode and cathode and also between the grid and cathode. Microphone 14 thus controls the amplitude of the oscillations generated in the system by acting upon the input circuit which passes from the grid 4 to the cathode 2, and also by acting upon the output circuit which passes from anode 3 to cathode 2. The input and output circuits have a common portion, but this feature is not essential to the invention. The coil 8 will in general offer only low impedance to currents of low frequency, such as correspond to the sound waves of speech. The effects upon the input and output circuits will be mutually aiding. Increased positive potential upon the grid and anode will each tend to cause increased space current, and decreased potentials will each tend to cause decreased space current. The relative magnitudes of the effects upon the two circuits will depend upon the constants of the tube and the associated circuits, although in general the effect upon the input circuit will be the greater. The coils 12 and 13 constitute a transformer and typify one method only of coupling the variable impedance device to the oscillator. When a transformer is used the ratio of transformation will be chosen in accordance with the constants of the system. The microphone 14 will also be designed in accordance with the constants of the tube and other elements of the circuit so as to give maximum efficiency. The modulated oscillations may be led off from the system by a suitable circuit 16 by means of a coil 17 coupled to the coil 8. A system of this kind may be utilized in systems for signaling either by wire or wireless methods. The circuit 16 is illustrated herein as a conventional antenna, but might equally well be any other circuit to which modulated high frequency oscillations are to be supplied.

The microphone 14 typifies any suitable voice controlled or low frequency signal responsive means for applying low or speech frequency potentials to the grid and space current circuits of the electronic discharge device, and other equivalent means may obviously be substituted therefor.

Having described one form of the invention in detail, the novel features thereof will be set forth both broadly and specifically in the appended claims.

What is claimed is:

1. In combination, an electrical discharge device having an anode, a cathode and an impedance-varying element, an input circuit and an output circuit for said device, and a variable impedance device acting upon both of said circuits so that the effects thereon are mutually aiding.

2. A modulating system including a vacuum tube oscillation generator having an input circuit and an output circuit, and a variable potential producing means acting upon both of said circuits in such a manner that the effects thereon are mutually aiding.

3. In combination, an electric discharge device including an anode, a cathode, and an impedance-varying element, an input circuit and an output circuit therefor, means for coupling said circuits, and a variable impedance signaling means for affecting said output and input circuits additively to vary the amplitude of the oscillations generated in accordance with signals.

4. An oscillation generator including an anode, a cathode and an impedance-varying element, an input circuit connected to said cathode and said impedance-varying element, an output circuit connected to said anode and cathode, and a microphone inductively associated with said input and output circuits for controlling the oscillations generated.

5. In a modulating system, an electron discharge device having a grid circuit and a plate circuit, means associated therewith whereby said discharge device functions as a generator of continuous electrical oscillations, and means for varying the potential of both circuits in a mutually aiding manner to modulate the generated oscillations.

6. In a modulating system, an electron discharge device having a grid circuit and a plate circuit, means associated therewith whereby said discharge device functions as a generator of continuous electrical oscillations, and means for varying the potential of both of said circuits in a mutually aiding manner in accordance with signals.

7. In a signaling system, an antenna circuit, an electron discharge device including an anode, an electron emitting cathode and an impedance-varying element in an evacuated vessel for producing high frequency oscillations in the said antenna circuit, a space current circuit connected to said anode and cathode, a source of constant potential in said space current circuit, and means including a telephone transmitter for applying a potential to said space current circuit which varies in accordance with sound waves for producing corresponding variations of said high frequency oscillations.

8. The method of producing modulated oscillations by means of an electrical discharge device having an anode, a cathode and a grid, which method comprises applying simultaneously to the anode-cathode and the grid-cathode circuits of said device a comparatively low frequency potential.

9. The combination in a wireless signaling system of an antenna, means comprising an electron discharge device having plate and grid circuits associated therewith for producing continuous electrical waves of radio frequency in said antenna, and means for supplying a potential which varies at audio frequencies to the plate circuit of said electron discharge device to vary the amplitude of the waves produced.

10. The combination in a wireless signaling system of an antenna, means comprising an electron discharge device having plate and grid circuits associated therewith for producing continuous electrical waves in said antenna, a source of constant potential in the plate circuit of said electron discharge device, and means for supplying a variable potential to the plate circuit of said device in addition to the constant potential to vary the amplitude of the waves produced.

11. The combination in a wireless signaling system of an antenna, means comprising an electron discharge device having plate and grid circuits associated therewith for producing continuous electrical waves in said antenna, a telephone transmitter for producing potential variations which vary in accordance with variations in sound waves, and means for impressing said potential variations upon the plate circuit of said electron discharge device.

12. The combination in a wireless signaling system of an antenna, an electron discharge device having grid and plate circuits associated therewith, each of said circuits including a coil which is inductively related to a coil in said antenna, and means for supplying a potential which varies at audio frequencies to the plate circuit of said device.

13. The method of wireless signaling which consists in producing continuous electrical waves in an antenna by means of an electron discharge device having grid and plate circuits associated therewith and varying the amplitude of the waves thus produced by directly applying a variable potential to the plate circuit of said device.

14. The method which consists in producing continuous electrical waves by means of an electron discharge device having grid and plate circuits associated therewith and varying the amplitude of the waves thus produced by directly applying a variable potential to the plate circuit of said device.

15. The combination of means comprising an electron discharge device having grid and plate circuits associated therewith for producing continuous electrical waves, and means for supplying a potential which varies at audio frequencies to the plate circuit of said device to vary the amplitude of the waves produced thereby.

16. The combination of means comprising an electron discharge device having grid and plate circuits associated therewith for producing continuous electrical waves, a source of constant potential in the plate circuit of said device, and means for supplying a variable potential to the plate circuit of said device in addition to the constant potental source to vary the amplitude of the waves produced thereby.

17. The combination of means comprising an electron discharge device having grid and plate circuits associated therewith for producing continuous electrical waves, a telephone transmitter for producing potential variations which vary in accordance with variations in sound waves, and means for impressing said potential variations upon the plate circuits of said electron discharge device.

18. The combination in a wireless signaling system of an antenna, an electron discharge device for producing continuous electrical waves in said antenna comprising a filamentary cathode, a cooperating anode, a discharge controlling grid enclosed in a highly evacuated envelope and grid and plate circuits associated therewith, a source of constant potential in the plate circuit of said device, a telephone transmitter for producing potential variations which vary in accordance with variations in sound waves, and means for impressing said potential variations upon the plate circuit of said device.

19. The combination in a signaling system of means comprising an electron discharge device having an incandescent cathode, an anode and a grid for producing continuous electrical waves, and means for directly supplying a variable potential to a circuit connected between the cathode and anode of said device to vary the amplitude of the waves produced thereby.

20. The combination in a signaling system of means comprising an electron discharge device having an incandescent cathode, an anode and a grid for producing continuous electrical waves, a source of constant potential connected in a circuit between the cathode and anode of said device, and means for directly supplying a variable potential to said circuit between the cathode and anode of said device to vary the amplitude of the waves produced thereby.

21. The combination of an oscillation circuit with means comprising an electron discharge device having plate and grid circuits associated therewith for producing continuous electrical waves of high frequency in said oscillation circuit, and means for supplying a potential which varies at audio frequencies to the plate circuit of said electron discharge device to vary the amplitude of the waves produced.

22. The combination of an oscillation circuit with means comprising an electron discharge device having plate and grid circuits associated therewith for producing continuous electrical waves in said oscillation circuit, a source of constant potential in the plate circuit of said electron discharge device, and means for supplying a variable potential to the plate circuit of said device in addition to the constant potential to vary the amplitude of the waves produced.

23. The combination of an oscillation circuit with means comprising an electron discharge device having plate and grid circuits associated therewith for producing continuous electrical waves in said oscillation circuit, a telephone transmitter for producing potential variations which vary in accordance with variations in sound waves, and means for impressing said potential variations upon the plate circuit of said electron discharge device.

24. The combination of an oscillating circuit with an electron discharge device having grid and plate circuits associated therewith, each of said circuits having an inductance coupling to said oscillating circuit, and means for supplying a potential which varies at audio frequencies to the plate circuit of said device.

25. The method of signaling which comprises producing continuous electrical waves in an oscillation circuit by means of an electron discharge device having plate and grid circuits associated therewith and varying the amplitude of the waves thus produced by directly applying a variable potential to the plate circuit of said device.

26. The combination of an oscillation circuit with an electron discharge device for producing continuous electrical waves in said oscillation circuit, comprising a filamentary cathode, a cooperating anode, a discharge controlling grid enclosed in a highly evacuated envelope, and grid and plate circuits associated therewith, a source of constant potential in the plate circuit of said device, a telephone transmitter for producing potential variations which vary in accordance with variations in sound waves, and means for impressing said potential variations upon the plate circuit of said device.

27. In a transmitting system, a work circuit, and means for generating and transmitting the generated oscillations to said work circuit comprising an evacuated vessel containing grid, plate and filament electrodes, a circuit connecting said grid electrode with said filament electrode, a circuit connecting said grid electrode with said plate electrode, and a signalling device associated with said grid-filament circuit.

28. A modulating system comprising a vacuum tube having an anode, a cathode and an impedance-varying element, an input circuit connected to said cathode and said impedance-varying element, an output circuit connected to said anode and said cathode, a feed-back coupling between said input circuit and said output circuit, and a device directly associated with said output circuit for variably affecting the current flow therethrough in accordance with signals.

29. The combination, in a signaling system, of means comprising an electron discharge device having an incandescent cathode, an anode and a grid, with appropriate circuit connections whereby said device functions as a generator of continuous electrical waves, a circuit path having one end terminating at said cathode and another end terminating at said anode, and means for impressing a variable low frequency modulating potential upon said circuit connection external to said device.

30. The combination, in a signaling system, of means comprising an electron discharge device having an incandescent cathode, an anode and a grid, for producing continuous electrical waves, a source of constant potential connected in a circuit between the cathode and anode of said device, and means for impressing upon said circuit between the cathode and anode and external to said device a variable potential to vary the amplitude of the waves produced thereby.

31. The combination, in a wave generating and varying system, of means comprising an electron discharge device having an emitting cathode, at least one anode, and at least one grid for producing continuous electrical waves, a circuit connecting the cathode with an anode, and means for impressing a variable potential upon said circuit to vary the waves produced by said device.

32. An electron discharge circuit arrangement comprising a device having an emitting cathode, an anode and a third electrode enclosed in an evacuated receptacle, means external to said receptacle for producing variable voltages, a plurality of circuits interconnecting said cathode, anode and third electrode externally of said receptacle, and means for applying the variable voltages to a plurality of said circuits.

33. The combination, in a signaling system, of means comprising an electron discharge device having a cathode, an anode and a control electrode for producing continuous electrical waves, a circuit connecting the anode externally of said device with another electrode of said device, and means for applying a variable potential to said circuit to vary the amplitude of waves produced.

In witness whereof, I hereunto subscribe my name this 24th day of May, A. D. 1918.

RALPH V. L. HARTLEY.